United States Patent Office

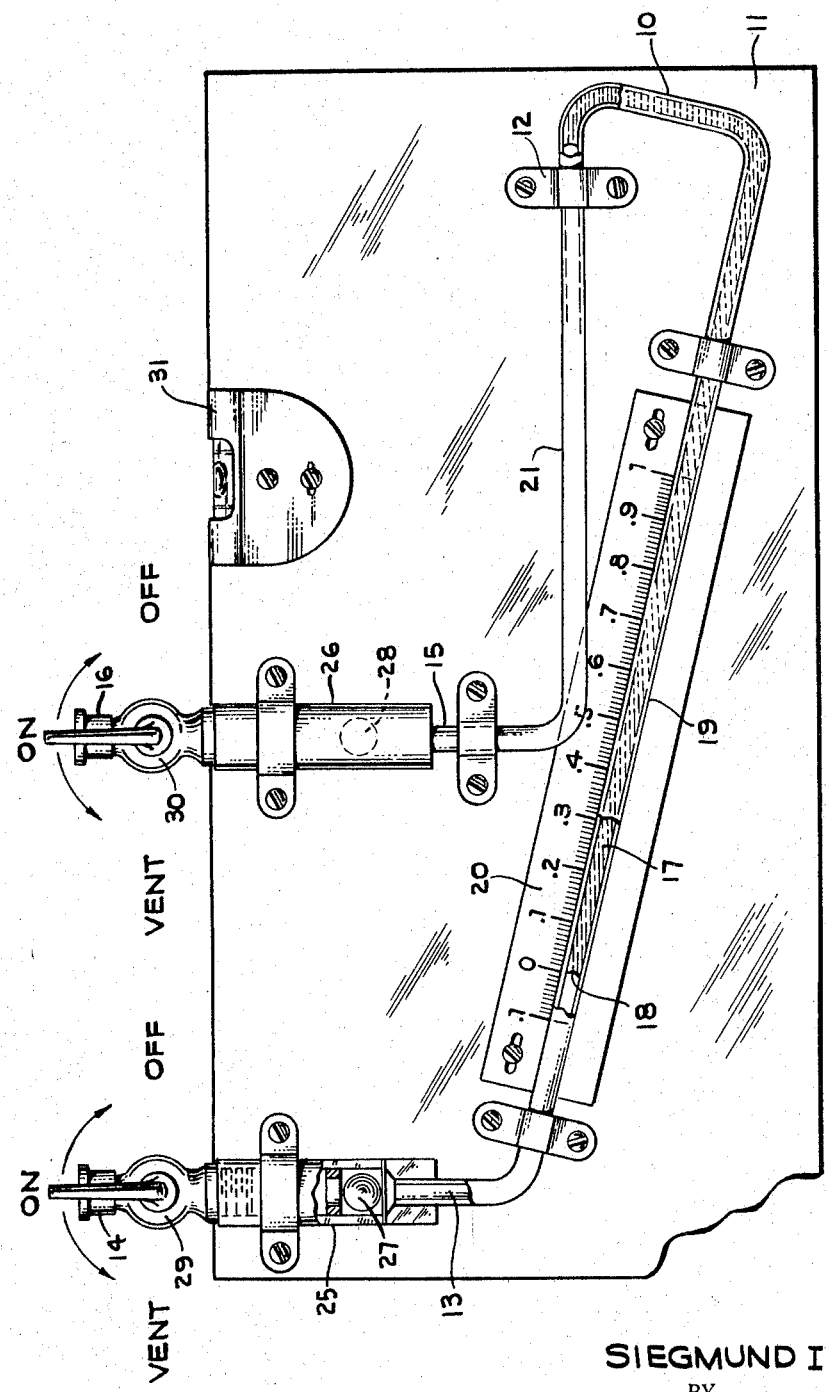

3,298,234
Patented Jan. 17, 1967

---

3,298,234
MANOMETER
Siegmund I. Goldman, 1016 Braemer Drive,
Winter Park, Fla. 32789
Filed July 9, 1964, Ser. No. 381,431
12 Claims. (Cl. 73—401)

This invention relates to an improved manometer configuration and more particularly to an inclined manometer having a horizontal portion connected to the usual inclined portion, this horizontal portion serving as an infinite reservoir for manometer fluid, which prevents inaccuracies resulting from loss of fluid due to evaporation or the like.

For many years manometers have been in wide use in this and foreign countries for the purpose of indicating differentials in pressures and the like easily and economically. One example of the manometer in wide use is the U tube manometer in which mercury, water, oil or other liquid is disposed in equal legs. Then upon the upper portion of at least one leg being connected to pressure, the liquid will be deflected to a greater extent on the high pressure side than on the low pressure side, thus to indicate the differential in pressure. A scale is typically provided, against which a reading may be made. If at any time the pressure differential is removed, the level of the two legs will again equalize.

As will be apparent, if liquid is lost from either of the legs, this will cause a new zero level of the two legs when pressure has been removed. Obviously, at this point the manometer must be corrected before the next reading can be made, this being accomplished either by adding enough fluid to bring both legs up to the original calibration point, or else by loosening the scale upon which readings are made and sliding it vertically with respect to the U tube so that it will reference a new zero point.

In order for the reading of a manometer to be more sensitive it is well known in the art to use an inclined manometer, in which oil for example may be used as the manometer fluid. A deflection will be brought about by a differential in pressure as in the case of the U tube manometer, but in this instance, each inch of deflection is spread over a longer scale and hence such a device is capable of being read more accurately.

Inclined tube manometers are quite popular for use in indicating whether filters in air conditioning ducts for example are clean or dirty. In such installations, the high pressure side of the manometer is connected to the air conditioning duct upstream of the filter, whereas the other leg is connected to the duct downstream of the filter. As will be apparent, if the filter is reasonably clean the drop in pressure across the filter will be slight and the reading on the inclined scale will be small. However, if the filter is quite dirty, the reading will be large.

In some air conditioning installations, manometers used as filter draft gauges may go unchecked for weeks. At such time as checking is to be done, inasmuch as hundreds of manometers may be involved if the installation be large, the amount of time that must be spent in reading the manometers must be kept to a minimum if the operation is to be at all efficient.

Although oil of a certain specific index is employed in inclined manometers of this type, and such oil is less subject to evaporation than water for example, nevertheless over a period of time, some evaporation of the oil does take place. In order to compensate for such evaporation, in the past it has been necessary to check the zero setting of each gauge each time a reading is to be made, for not to do so may well incur a sizeable error. This is of course because no matter in which leg of the manometer evaporation of the fluid takes place, a new zero level is in effect brought about inasmuch as liquid seeks its own level. In view of this fact, therefore, the person reading the gauges has the option of adding a compensating amount of fluid to the manometer so as to bring the height of the inclined leg back to zero, or alternatively he can readjust the scale on the device so as to cause the zero reading to occur at a new location. No matter which of these alternatives are followed, however, the result nevertheless is to necessitate taking the manometer off the line, and to require a sizeable amount of the operator's time.

If the manometer is located in a remote location or disposed behind a glass wall or the like, the burden of zeroing the manometer before taking a reading is even more onerous.

In accordance with this invention, I provide a novel inclined tube manometer configuration in which a portion of the manometer passage is disposed for a comparatively substantial distance in a horizontal plane, this constituting what will hereinafter be referred to as an infinite reservoir. The advantages of this configuration will be particularly apparent when it is realized that the horizontal portion of the manometer passage is in aligned relationship with the zero point on the inclined portion of the manometer passage. By virtue of this arrangement, even though evaporation takes place, as long as sufficient fluid remains in the horizontal passage, fluid will always come to the original zero level in the inclined portion of the device upon the removal of pressure inasmuch as the manometer fluid of course seeks its own level.

In the utilization of this invention, fluid is added to the manometer tube or passage until such time as the horizontal portion is partially filled. By definition and construction, the meniscus in the inclined leg of the manometer is at the zero point. Upon one side of the device then being subjected to greater pressure than the other, the meniscus is driven along the scale, which of course enables a reading to be made that is indicative of the high pressure or the pressure differential. At this time, the fluid displaced from the inclined leg causes fluid to move along the horizontal leg. Thereafter, when pressure on the high pressure end is reduced or removed, fluid of course retreats from the horizontal leg a commensurate amount.

It is most important to note that despite loss of fluid due to evaporation or other causes, fluid will always return to the original zero reading at such time as the high pressure is removed, meaning of course that the accuracy of the device is unimpaired. This is to say, as long as sufficient fluid remains in the manometer in order for there to be some fluid in the horizontal leg, the manometer will give an accurate reading without adjustment of the scale or any other portion of the device being necessary. This last statement is manifestly true in view of the fact that upon pressure being removed from the manometer, the fluid in the horizontal leg will run down into the other portion of the manometer and up to the zero level of the inclined portion again by virtue of the fact that the horizontal leg is created so as to be in the same horizontal plane as the zero reading of the scale. As a further point, it should be noted that as long as a manometer in accordance with my teachings is basically set up in the proper manner, the device will continue to operate correctly despite the fact that so much fluid has evaporated that there is insufficient fluid in the manometer passage for the fluid to return all the way to the zero point upon the cessation of pressure. This latter is of course true as long as there is sufficient fluid in the horizontal passage during the time pressure is applied to the device.

It is therefore a principal object of this invention to provide an inclined manometer of an improved type, which may be read instantaneously and accurately without zeroing of the device and still avoid inaccuracies due to evaporation.

It is another object of this invention to provide an inclined tube manometer having a horizontal passage acting as an infinite reservoir, which makes physical contact with the manometer by a user unnecessary even though a highly accurate reading is desired.

It is yet another object to provide an improved manometer configuration which quickly reveals to the user when so much evaporation has taken place that an inaccurate reading would be obtained if the manometer were read.

It is still another object to provide a manometer of simpler construction and lower cost, these being possibly by virtue of the fact that the manometer passage can be of one consistent size throughout its length.

These and other objects, features and advantages will be apparent from a study of the figure of drawing, wherein the principal portions of a preferred manometer configuration are set forth in some detail.

Referring to the drawing, it will be noted that the manometer passage is defined in this instance by a tube 10 of consistent inside diameter throughout substantially its entire length, which tube is mounted on a mounting panel or plate 11 such as by the use of several small U-shaped straps 12. However, it should be borne in mind that my novel manometer configuration can be defined by other means, such as by a block of transparent material in which manometer passages are created during the molding process or by subsequent drilling. Patent No. 2,320,122 is an example of latter teaching.

One end of the manometer passage, such as end 13 may be regarded as the high pressure end, with a suitable fitting 14 thereabove being adapted to be connected to a source of pressure, such as the upstream side of an air conditioning duct. The other end of the manometer tube, shown at 15, is ordinarily the low pressure end, above which is a fitting 16 that typically would be connected to the downstream side of the filter of the air conditioning duct.

As will be noted, an appropriate manometer fluid 17 is disposed in the tube 10, which a meniscus 18 being formed near the upper end of the inclined portion 19 of the manometer. A scale 20 is provided behind the inclined portion 19 of the tube, with the zero position of which corresponding with the position of the meniscus 18. As will be apparent, upon high pressure being applied to fitting 14, the fluid 17 will be caused to move down the inclined portion of the tube, with readings on the scale 20 providing an indication of the amount of pressure by virtue of appropriate numerals thereon.

Important note should be made of the horizontal portion 21 of the manometer tube, which is located intermediate the inclined portion 19 and the low pressure outlet 16. This horizontal portion is ordinarily several inches in length, and typically is of a length corresponding to the length of the inclined portion of the manometer. However, this horizontal portion must be so constructed and arranged that when oil or other manometer fluid is in the horizontal leg 21, a level will be reached in the inclined portion of the tube that is the same height above a given datum plane as the horizontal portion when there is no pressure difference between the two outlets. Stated differently, the zero reading on the scale 20 must be so located that when fluid is in the horizontal leg, the meniscus of the inclined leg will be at the zero point.

As will be apparent from this advantageous construction, no zeroing of this device is necessary even though unattended for a number of months inasmuch as even if evaporation does take place, the reservoir of fluid in the horizontal leg will seek a level with the fluid in the inclined leg and these two fluid levels will always cause the meniscus in the inclined leg to reside at the zero point of the scale when no pressure source is connected to the device. Undesired movement of the fluid along the horizontal passage is of course prevented by sizing the tube in accordance with the viscosity of the fluid to be used therein, so that molecular attraction will hold the meniscus in the horizontal tube portion in the desired position.

As to other features of my configuration, in order to prevent loss of a substantial amount of fluid due to an over pressure or substantial under pressure, I provide enlarged portions 25 and 26 above the high and low ends of the tube respectively, which enlarged portions are of substantially hollow construction so as to accommodate lightweight spheres 27 and 28, which are light enough to float upon the fluid. A seat is provided above each of these spheres, so that upon fluid rising in either enlargement, the sphere will be caused to float and to reside upon the seat thereabove to bring about a prevention of fluid rising to a greater height.

Petcocks 29 and 30 may be provided above the enlargements 25 and 26 so that pressure may be shut off entirely if desired. I prefer the use of three way valve type petcocks, as shown. Bubble level 31 is provided so that a determination can be made before each reading to see that the device is disposed in the proper horizontal attitude. Significantly, the bubble level is not necessary insofar as installation of my device is concerned inasmuch as the user can find a more accurate indication of the correct, horizontal position for the device by making sure that the meniscus 18 is at zero.

In the operation of the device shown in the drawing, the higher pressure to be read is connected to fitting 14, with the low pressure to be read connected to fitting 16. Obviously, in some instances fitting 16 can remain open to the atmosphere so that the extent of the high pressure above atmospheric pressure can be ascertained.

The meniscus 18 will tend to travel down inclined tube 19 to an extent that reflects the pressure or differential pressure involved being measured, with the operator being able to obtain a reading by noting the position on the scale 20 corresponding to the meniscus.

As a result of this movement, fluid will tend to move along the horizontal leg 21, the extent of course reflecting the amount of fluid displaced by the high pressure. The length of the horizontal leg should of course be comparable to the length of the scale and both of these of a length dependent upon the use to which the device is to be put. As should now be apparent, even though my manometer be attended seldom and disposed in a remote location, the operator can be assured of obtaining a correct reading as long as the manometer fluid is properly in the horizontal leg.

As to a preferred embodiment, I prefer to use a continuous length of glass tubing configured as shown in the drawing, which for example may have an inside diameter of ⅛ inch, and an outer diameter of ¼ inch. For this size tube, the specific index of the oil should be at or near .834, in which instance the surface tension of the meniscus in the horizontal portion of the device keeps the fluid from spilling down the horizontal portion. Obviously, this type of construction is quite economical, and even further economy can of course be realized by eliminating the petcocks and enlarged end portions, and connecting the tubing from the source of the high and low pressure directly to the manometer tube ends.

While not preferred, another configuration involving the principles of my invention could utilize an inclined portion of the manometer that extends for some distance above the level of the horizontal portion of the manometer passage, so that the higher pressure to be read can be applied to the outlet above the horizontal passage. This of course would involve a higher degree of filling of the horizontal leg so that there would be enough fluid in the manometer so that some fluid could be in the horizontal leg during movement of the meniscus above the zero point of the scale.

As should now be quite apparent, I have provided a highly advantageous and simplified inclined tube manometer that enables highly accurate readings to be taken quickly and without effort.

Other embodiments based on my novel horizontal leg concept will be apparent to those skilled in the art, and I am not to be limited except as required by the scope of the appended claims.

I claim:

1. An improved inclined tube manometer needing no zeroing in normal use comprising a manometer passage configured to have an inclined portion interconnected with a horizontal portion, manometer fluid disposed in said passage to a sufficient depth so that fluid enters at least part of each of said portions, means for indicating adjacent an upper portion of said inclined portion a zero location, said zero location being the same height above a common datum plane as the height of said horizontal portion, at least one fitting on said manometer for the application of pressure against the fluid in said passage, thereby to cause the fluid in said inclined portion to move along said inclined portion, the amount of fluid in said horizontal portion changing in accordance with such movement.

2. The improved inclined manometer as defined in claim 1 wherein said fitting for the application of pressure is adjacent said inclined portion.

3. The improved inclined manometer as defined in claim 1 wherein said fitting for the application of pressure is adjacent said horizontal portion.

4. The improved inclined manometer as defined in claim 1 wherein fittings are provided for the application of pressure to each end of said passage.

5. An inclined tube manometer requiring no zeroing before an accurate reading can be obtained, said manometer comprising a hollow passage serving as a manometer tube and partially filled with a liquid, one portion of said manometer passage being inclined, and another portion of said passage being disposed horizontally, with said horizontal portion corresponding in height above a common datum plane to an upper portion of said inclined portion of said passage, means for establishing a zero point on said inclined portion so that when fluid is in said horizontal portion, it also stands in said inclined portion to a height corresponding to said zero point, means for connecting pressure to at least one end of said passage, thus to cause fluid to move along said inclined tube portion as well as to change the amount of fluid in said horizontal leg, said manometer needing no zeroing even after loss of some degree of fluid to evaporation.

6. The inclined tube manometer as defined in claim 5 wherein said means for connecting pressure to said passage is adjacent said inclined portion.

7. The inclined tube manometer as defined in claim 5 wherein said means for connecting pressure to said passage is adjacent said horizontal portion.

8. The inclined tube manometer as defined in claim 5 wherein said means for connecting pressure to said passage is at each end of said passage.

9. An improved inclined tube manometer needing no zeroing in normal use comprising a manometer passage configured to have an inclined portion as well as a horizontal portion, a high pressure connection to the end of said manometer passage adjacent said inclined portion and a low pressure connection adjacent said horizontal portion, manometer fluid disposed in said passage to a sufficient depth so that fluid at least partially enters said horizontal portion, means for indicating adjacent said inclined portion a zero location, said zero location being the same height above a common datum plane as the height of said horizontal portion, the fluid in said inclined portion tending to move down said inclined portion and into said horizontal portion upon the pressure at said high pressure fitting exceeding that at said low pressure fitting, said fluid returning to said zero location upon the cessation of pressure as long as at least some fluid remains in said horizontal portion, by virtue of the common height of said zero point and said horizontal portion, and the tendency of a fluid to seek its own level.

10. The improved inclined tube manometer as defined in claim 9 in which a calibrated scale is provided along said inclined portion, and said manometer passage is defined by a single piece of tubing.

11. An inclined tube manometer requiring no zeroing before an accurate reading can be obtained, said manometer comprising a manometer tube partially filled with a liquid, one portion of said manometer tube being inclined, and another portion of said tube being disposed horizontally, with the horizontal portion corresponding in height above a common datum plane to an upper portion of said inclined portion, means for establishing a zero point on said inclined portion, corresponding in height to the height of said horizontal portion, means for connecting pressure to the end of said manometer tube adjacent said inclined portion, thus to cause fluid to move down said inclined portion and into said horizontal portion, said manometer needing no zeroing even after loss of some degree of fluid to evaporation inasmuch as upon the cessation of pressure, some fluid in said horizontal portion will return along said inclined portion to the zero point by virtue of the tendency of fluid to seek its own level.

12. The improved inclined tube manometer as defined in claim 11 in which a calibrated scale is provided along said inclined portion, and said manometer passage is defined by a single piece of tubing.

References Cited by the Examiner

FOREIGN PATENTS 12,255    5/1913    Great Britain.
65,527    8/1947    Denmark.

LOUIS R. PRINCE, *Primary Examiner.*

W. O. WOODIEL, *Assistant Examiner.*